US010176944B2

(12) United States Patent
Saito et al.

(10) Patent No.: US 10,176,944 B2
(45) Date of Patent: Jan. 8, 2019

(54) ROTATIONAL MOVEMENT DETECTION DEVICE

(71) Applicant: KABUSHIKI KAISHA TOKAI RIKA DENKI SEISAKUSHO, Aichi (JP)

(72) Inventors: Koji Saito, Aichi (JP); Yoshikazu Kataoka, Aichi (JP); Tadashi Usuya, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 15/319,957

(22) PCT Filed: Jun. 10, 2015

(86) PCT No.: PCT/JP2015/066721
§ 371 (c)(1),
(2) Date: Dec. 19, 2016

(87) PCT Pub. No.: WO2016/002449
PCT Pub. Date: Jan. 7, 2016

(65) Prior Publication Data
US 2017/0140886 A1 May 18, 2017

(30) Foreign Application Priority Data

Jun. 30, 2014 (JP) ................. 2014-135197

(51) Int. Cl.
*G01D 5/14* (2006.01)
*H01H 25/04* (2006.01)
(Continued)

(52) U.S. Cl.
CPC .......... *H01H 25/04* (2013.01); *B60Q 1/1469* (2013.01); *G01D 5/14* (2013.01); *G01D 5/145* (2013.01); *H01H 19/00* (2013.01)

(58) Field of Classification Search
CPC ......... G01D 5/145; H01H 19/00; H01H 25/04
(Continued)

(56) References Cited

U.S. PATENT DOCUMENTS 8,237,432 B2 * 8/2012 Inotsuka ................ G01D 5/145
324/207.2
2005/0235771 A1 * 10/2005 Yokoyama .......... F16H 59/0204
74/473.33
(Continued)

FOREIGN PATENT DOCUMENTS

EP   1923683 A1   5/2008
JP   2001-012633 A   1/2001
(Continued)

OTHER PUBLICATIONS

Office Action issued in the corresponding Japanese application No. 2014-135197 dated Sep. 5, 2017.
(Continued)

*Primary Examiner* — Reena Aurora
(74) *Attorney, Agent, or Firm* — Roberts Mlotkowski Safran Cole & Calderon, P.C.

(57) ABSTRACT

A rotational movement detection device includes a rotating member including a through hole passing therethrough from a first surface to a second surface opposite the first surface, the rotating member rotating around the through hole to generate a magnetic field around the rotating member, a rotation angle detection part that detects a rotation angle of the rotating member, a movement detection part that detects a movement along a rotational axis of the rotating member, and a holding part including a guide part and an arrangement part formed integrally therein, the guide part being inserted into the through hole to guide the rotation of the rotating member and to hold the rotating member, the arrangement
(Continued)

part having thereon the movement detection part arranged facing a side surface of the rotating member.

6 Claims, 9 Drawing Sheets

(51) Int. Cl.
*H01H 19/00* (2006.01)
*B60Q 1/14* (2006.01)

(58) Field of Classification Search
USPC .................................................. 324/207.25
See application file for complete search history.

(56) References Cited

U.S. PATENT DOCUMENTS

| | | |
|---|---|---|
| 2008/0211609 A1 | 9/2008 | Ichimura |
| 2013/0229339 A1 | 9/2013 | Takahata et al. |

FOREIGN PATENT DOCUMENTS

| | | |
|---|---|---|
| JP | 2006-073311 A | 3/2006 |
| JP | 2006-139790 A | 6/2006 |
| JP | 2008-218067 A | 9/2008 |
| JP | 2013-182491 A | 9/2013 |

OTHER PUBLICATIONS

English translation of the International Preliminary Report on Patentability issued in the corresponding application PCT/JP2015/066721 dated Jan. 3, 2017.

International Search Report PCT/JP2015/066721 dated Aug. 4, 2015.

Chinese Patent Application No. 201580012693.9 Office Action, dated May 27, 2017, and English translation thereof.

\* cited by examiner

ROTATIONAL MOVEMENT DETECTION DEVICE

CROSS-REFERENCE TO RELATED APPLICATIONS

The present application is a U.S. National Phase of PCT/JP2015/066721 filed on Jun. 10, 2015 claiming priority to Japanese Patent application No. 2014-135197 filed on Jun. 30, 2014. The disclosure of the PCT Application is hereby incorporated by reference into the present Application.

TECHNICAL FIELD

The present invention relates to a rotational movement detection device.

BACKGROUND ART

A lever switch device including the following configuration is known. A first rotating body and a second rotating body that rotate in response to a rocking operation on an outer lever are provided, and two magnetism detection elements, which are provided corresponding to respective magnets mounted in the center of the rotating bodies, are used to detect magnetism of the two magnets. A control means detects a rotation angle of each of the rotating bodies on the basis of detection signals from the magnetism detection elements and outputs an operation signal based on the detected rotation angle (see Patent Document 1, for example).

CITATION LIST

Patent Document

Patent Document 1: Japanese Unexamined Patent Application Publication No. 2008-218067A

SUMMARY OF INVENTION

Technical Problem

In the lever switch device disclosed in Patent Document 1, looseness in the first rotating body and the second rotating body may lead to a drop in detection accuracy.

An object of the present invention is to provide a rotational movement detection device with improved detection accuracy that is achieved by suppressing looseness in the rotation of a rotating member.

Solution to Problem

A rotational movement detection device according to an aspect of the present invention includes: a rotating member including a through hole passing therethrough from a first surface to a second surface opposite the first surface, the rotating member rotating around the through hole to generate a magnetic field around the rotating member; a rotation angle detection part that detects a rotation angle of the rotating member; a movement detection part that detects movement along a rotational axis of the rotating member; and a holding part including a guide part and an arrangement part formed integrally therein, the guide part being inserted into the through hole to guide the rotation of the rotating member and to hold the rotating member, the arrangement part having thereon the movement detection part arranged facing a side surface of the rotating member.

Advantageous Effects of Invention

According to an aspect of the present invention, a rotational movement detection device with improved detection accuracy that is achieved by suppressing looseness in the rotation of a rotating member can be provided.

DESCRIPTION OF EMBODIMENTS

Overview of Embodiment

A rotational movement detection device according to an embodiment includes: a rotating member including a through hole passing therethrough from a first surface to a second surface opposite the first surface, the rotating member rotating around the through hole to generate a magnetic field around the rotating member; a rotation angle detection part that detects a rotation angle of the rotating member; a movement detection part that detects movement along a rotational axis of the rotating member; and a holding part including a guide part and an arrangement part formed integrally therein, the guide part being inserted into the through hole to guide the rotation of the rotating member and to hold the rotating member, the arrangement part having thereon the movement detection part arranged facing a side surface of the rotating member.

Overall Configuration of Lever Switch Device 1

Figure 1:
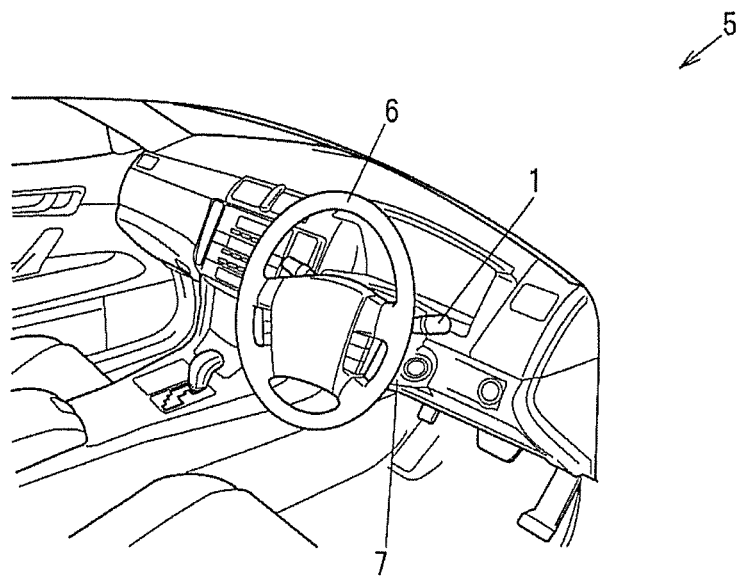
FIG. 1 is a schematic diagram illustrating the interior of a vehicle in which a lever switch device according to an embodiment of the present invention is installed.
Figure 2:
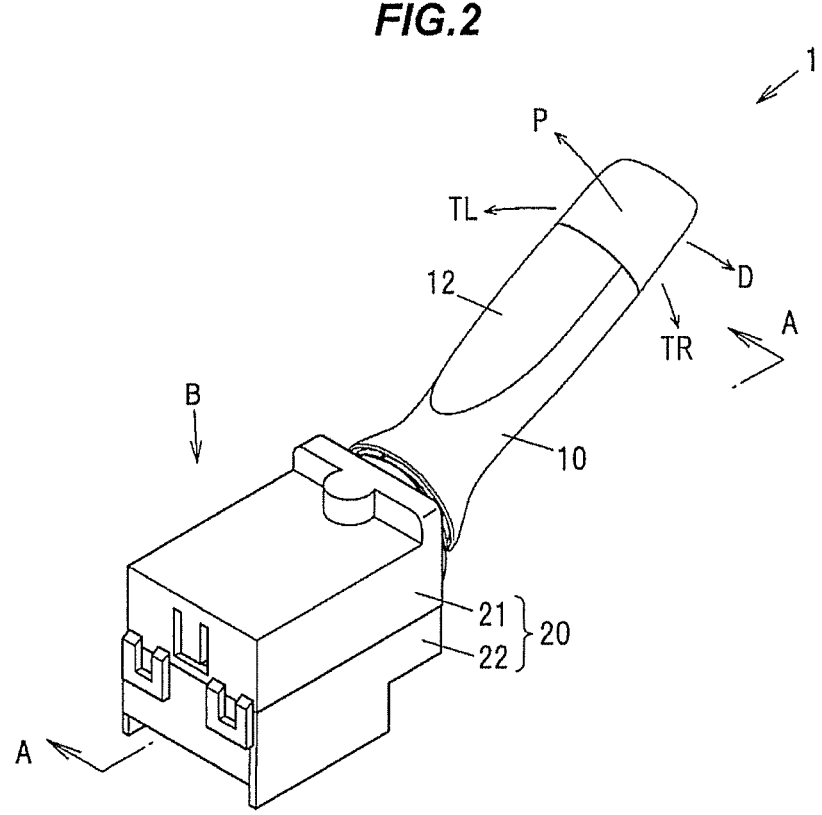
FIG. 2 is a perspective view illustrating the outward appearance of the lever switch device.
Figure 3:
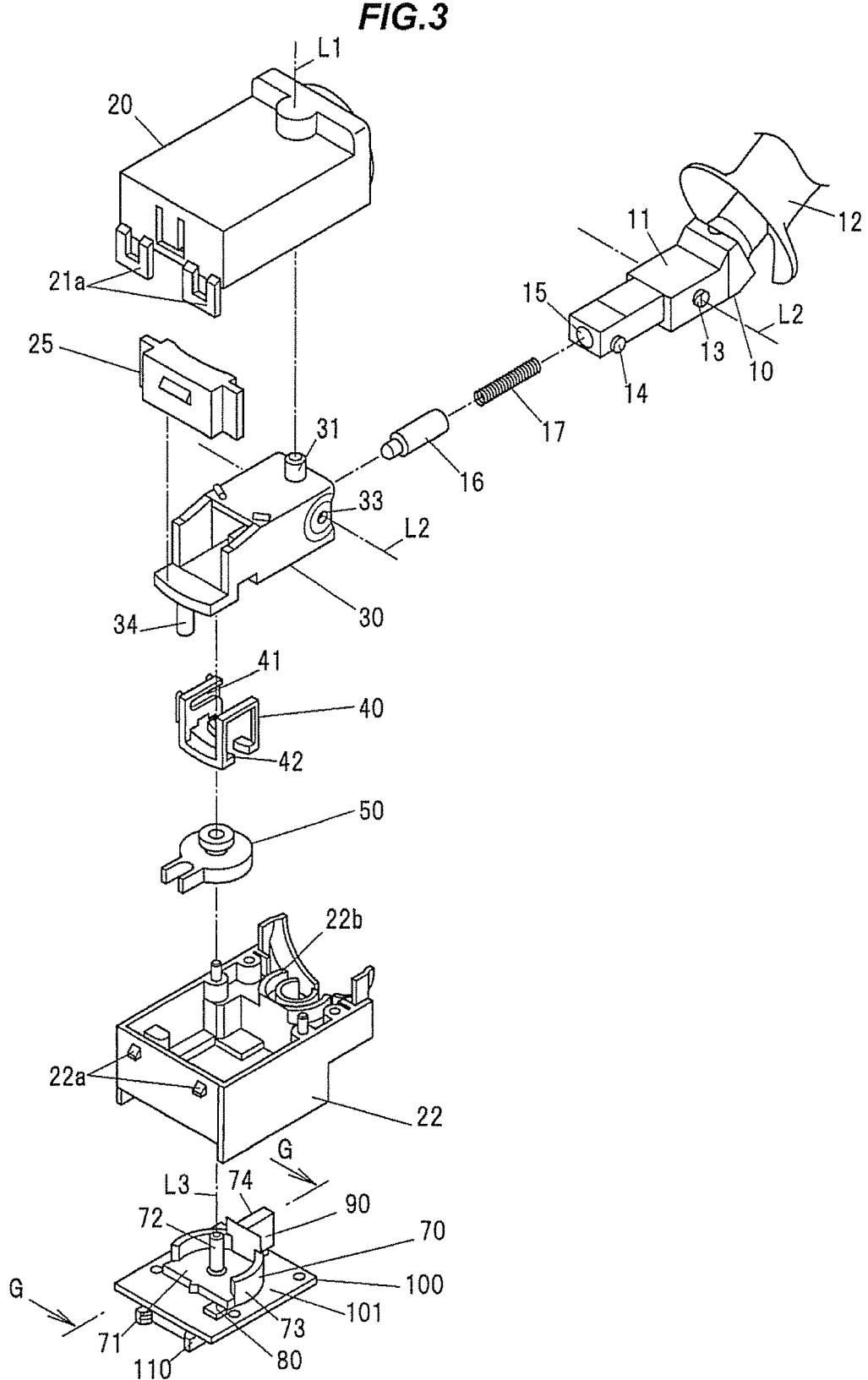
FIG. 3 is an exploded perspective view illustrating the lever switch device.
Figure 4:
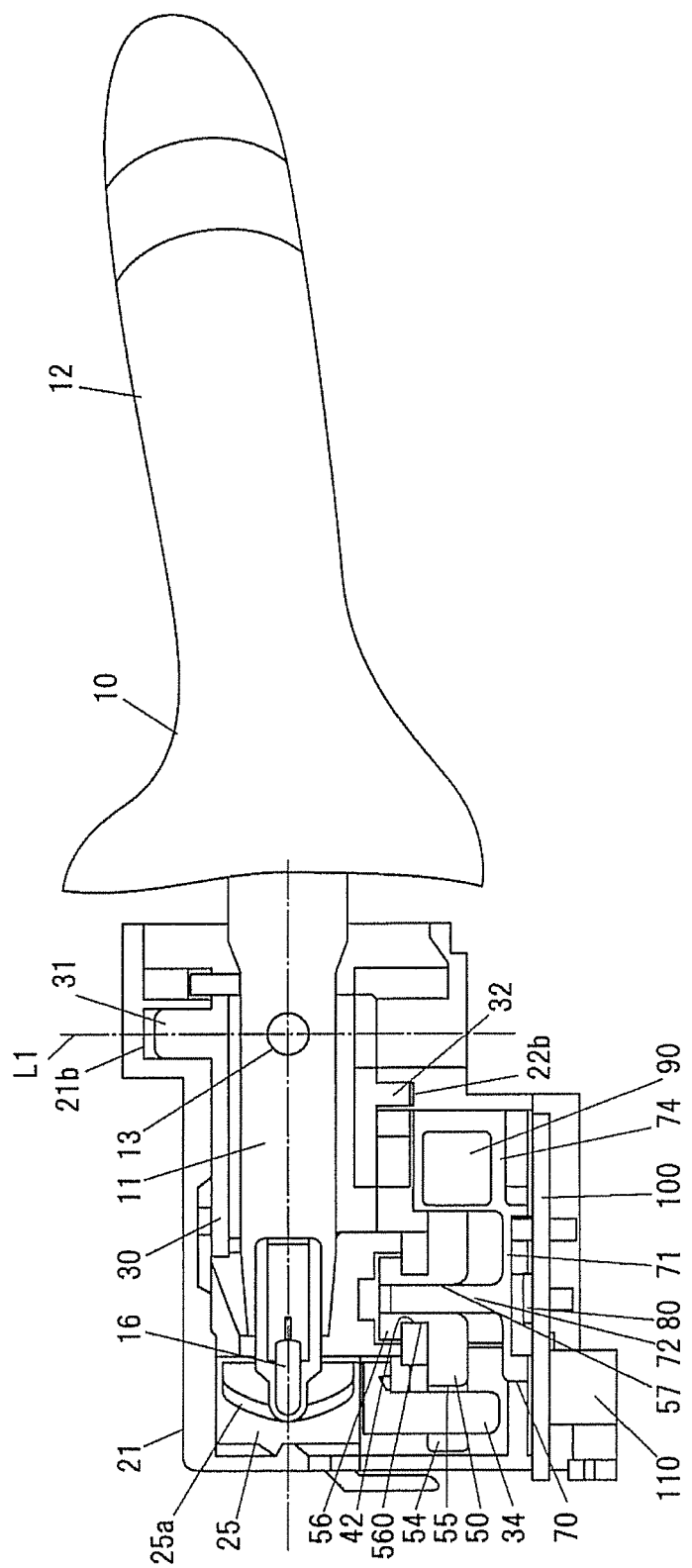
FIG. 4 is a cross-sectional view taken along A-A in FIG. 2.

FIG. 1 is a schematic diagram illustrating the interior of a vehicle in which a lever switch device according to the embodiment of the present invention is installed. FIG. 2 is a perspective view illustrating the outward appearance of the lever switch device. FIG. 3 is an exploded perspective view illustrating the lever switch device. Additionally, FIG. 4 is a cross-sectional view taken along A-A in FIG. 2.

A lever switch device 1 serving as a rotational movement detection device is, for example, an operation apparatus capable of operating turn signals (directional indicators), headlamps, and the like of a vehicle 5. As illustrated in FIG. 1, the lever switch device 1 is mounted in the vicinity of a steering wheel 6 of the vehicle, and is disposed projecting from a steering column cover 7 that covers a steering column.

The lever switch device 1, which is disposed projecting to the right in FIG. 1, is used to operate directional indicators, headlamps, and the like, for example. The present embodiment assumes a vehicle that has the steering wheel on the right side, and describes the lever switch device 1, which projects to the right, as being capable of operating directional indicators and the like.

As illustrated in FIGS. 2 and 3, the lever switch device 1 includes: a rotating member (magnet 50) including a through hole (through hole 57) passing therethrough from a first surface (upper surface 52) to a second surface (lower surface 53) opposite the first surface, the rotating member rotating around the through hole to generate a magnetic field around the rotating member; a rotation angle detection part (turn detection sensor 80) that detects a rotation angle of the rotating member; a movement detection part (dimmer detection sensor 90) that detects movement along a rotational axis of the rotating member; and a holding part (magnet holder 70) including a guide part (magnet support shaft 72) and an arrangement part (attachment part 74) integrally formed therein, the guide part being inserted into the through hole to guide the rotation of the rotating member and to hold the rotating member, the arrangement part (attachment part 74) having therein the movement detection part arranged facing a side surface of the rotating member.

Additionally, the lever switch device 1 includes: an operation part capable of a first rotation operation around a first rotational axis L1 and a second rotation operation around a second rotational axis L2 intersecting with the first rotational axis L1; a first conversion part that converts the first rotation operation performed on the operation part into rotation around a third rotational axis L3 of the magnet 50; and a second conversion part that converts the second rotation operation performed on the operation part into relative movement between the magnet 50 and an arrangement surface 101.

An operation lever 10 is an example of the operation part. A bracket 30 is an example of the first conversion part. A holder 40 is an example of the second conversion part.

Additionally, as illustrated in FIG. 3, the lever switch device 1 includes a housing 20, the bracket 30, and the magnet holder 70.

Here, the directions of the first rotation operation around the first rotational axis L1 indicated in FIG. 3 correspond to operations in the direction of an arrow TL and in the direction of an arrow TR that is opposite from the direction of the arrow TL, illustrated in FIG. 2. The operation in the direction of the arrow TL is, for example, a left turn operation that causes the turn signal (directional indicator) on the left side of the vehicle 5 to blink. The operation in the direction of the arrow TR is, for example, a right turn operation that causes the turn signal (directional indicator) on the right side to blink. In other words, the first rotation operation is a turn signal (directional indicator) operation for a left turn or a right turn, and is a turn operation on the operation lever 10.

On the other hand, the directions of the second rotation operation around the second rotational axis L2 indicated in FIG. 3 correspond to operations in the direction of an arrow D and in the direction of an arrow P that is opposite from the direction of the arrow D, illustrated in FIG. 2. The operation in the direction of the arrow D is, for example, an operation for switching the optical axis of the headlamps of the vehicle 5 upward (a dimmer HU operation). The operation in the direction of the arrow P is, for example, an operation for switching the optical axis of the headlights upward only for the period the operation is continued (a high beam flashing operation). The lever switch device 1 is, with respect to the operation in the direction of the arrow P, for example, configured as a momentary switch that returns to a neutral position after an operation is completed. Additionally, the lever switch device 1 is, with respect to the operation in the direction of the arrow D, for example, configured so that the operation lever 10 remains moved in the direction of the arrow D after the operation is completed, without returning to the neutral position. In other words, the second rotation operation is an operation for switching the optical axis of the headlamps, and is a dimmer operation of the operation lever 10.

Because an upper housing 21 of the lever switch device 1 illustrated in FIG. 2 is disposed in the vehicle 5 so as to face toward an operator, the directions of the above-described first operation are directions of an upward-downward operation in FIG. 2, from the viewpoint of the operator. The upward operation is an operation in the direction of the arrow TL, whereas the downward operation is an operation in the direction of the arrow TR. The directions of the second operation are directions of a forward-backward operation, from the viewpoint of the operator. The forward operation is an operation in the direction of the arrow P, in which the operation lever 10 is pulled toward the operator. The backward operation is an operation in the direction of the arrow D, in which the operation lever 10 is pushed away from the operator.

Note that an operation plane formed by the operation lever 10 being operated in the direction of the arrow TL and the direction of the arrow TR intersects with, and is substantially orthogonal to, an operation plane formed by the operation lever 10 being operated in the direction of the arrow D and the direction of the arrow P.

Configuration of Operation Lever 10

The operation lever 10 is contained within the bracket 30, and is configured and arranged so as to be capable of rotating integrally with the bracket 30 around the first rotational axis L1 in response to the first rotation operation (turn operation), and capable of rotating independent from the bracket 30 in the directions of the second rotation operation (dimmer operation) around the second rotational axis L2 that intersects with the first rotational axis L1.

The operation lever 10 includes: an inserted part 11 that is inserted into and contained within the bracket 30; a lever main body 12 that is held by the operator for turn operations, dimmer operations, and the like; and a rotational shaft part 13, positioned between the inserted part 11 and the lever main body 12, that corresponds to the second rotational axis L2, which is the center of rotation of the dimmer operation on the operation lever 10.

As illustrated in FIG. 3, the rotational shaft part 13 is formed projecting in both directions of the second rotational axis L2, and is rotatably supported by a support hole part 33 of the bracket 30 with the inserted part 11 inserted in the bracket 30.

A driving projection part 14 that fits with the holder 40, which will be described later, and is used for sliding the holder 40 during the dimmer operation, is formed projecting from a leading end side of the inserted part 11.

An insertion hole 15, into which a restraining piece 16 is inserted with a spring 17, is formed in a leading end of the inserted part 11. When the operation lever 10 is assembled with the bracket 30 and the housing 20, the restraining piece 16 is biased toward a restriction block 25 by the spring 17. This enables a necessary detent feeling to be provided during turn operations and dimmer operations.

Configuration of Housing 20

As illustrated in FIGS. 2 and 3, the housing 20 is constituted of the upper housing 21 and a lower housing 22. The restriction block 25 is mounted to the upper housing 21 so as to correspond to the restraining piece 16. A magnet holder 70 and a board 100 are fixed to the lower housing 22 from below. The upper housing 21 and the lower housing 22 are locked and fixed to each other by a locking part 21a and a locking projection part 22a engaging with each other.

The upper housing 21 is shaped as a box capable of housing the bracket 30 and the like therewithin. As illustrated in FIG. 4, a support hole part 21b that rotatably supports a rotation shaft part 31 of the bracket 30 is formed in an upper surface of the interior of the upper housing 21. The upper housing 21 rotatably supports an upper portion of the bracket 30, the lower housing 22 rotatably supports a lower portion of the bracket 30, and the bracket 30 is sandwiched between and contained within the upper housing 21 and the lower housing 22. An inner space that allows the bracket 30 to rotate around the support hole part 21b only by a predetermined angle (an angle necessary for the turn operation) is formed within the upper housing 21.

As illustrated in FIG. 4, the restriction block 25 is mounted within the upper housing 21. With the help of the biased restraining piece 16 and a restriction groove 25a, the restriction block 25 provides a necessary detent feeling during turn operations and dimmer operations.

The lower housing 22 is shaped as a box capable of housing the bracket 30 and the like therewithin. As illustrated in FIG. 4, an annular groove part 22b that rotatably supports an annular wall part 32 of the bracket 30 is formed in a lower surface of the interior of the lower housing 22. Like the upper housing 21, an inner space that allows the bracket 30 to rotate along the annular groove part 22b only by a predetermined angle (an angle necessary for the turn operation) is formed within the lower housing 22.

As illustrated in FIG. 3, the magnet holder 70 and the board 100 are fixed to the lower housing 22 from below.

Configuration of Bracket 30

The bracket 30 includes the rotation shaft part 31 that projects along the first rotational axis L1, and the annular wall part 32 as illustrated in FIG. 4. Accordingly, the bracket 30 is contained within the housing 20 so as to be capable of rotating around the first rotational axis L1 only by a predetermined angle (an angle necessary for the turn operation).

The support hole part 33 that fits with and supports the rotational shaft part 13 of the operation lever 10 in a rotatable manner is formed in the bracket 30 along the second rotational axis L2. This configuration allows the bracket 30 to contain the operation lever 10 therewithin so that the operation lever 10 can rotate, independent from the bracket 30, around the second rotational axis L2 in the directions of the second rotation operation (the dimmer operation).

A driving projection part 34 for rotationally driving the magnet 50, which will be described later, is formed in the bracket 30 in a position distanced from the first rotational axis L1. The driving projection part 34 rotates around the first rotational axis L1 along with the bracket 30 by a predetermined angle in response to the first rotation operation (the turn operation) on the operation lever 10.

Configuration of Holder 40

The holder 40 is contained within the bracket 30 so as to be capable of rotating around the first rotational axis L1 integrally with the bracket 30 in response to the first rotation operation (the turn operation) on the operation lever 10 and capable of sliding relative to the bracket 30 in response to the second rotation operation (the dimmer operation) on the operation lever 10.

As illustrated in FIG. 3, a fitting groove 41 with which the driving projection part 14 of the operation lever 10 fits is formed in an upper portion of the holder 40. The fitting groove 41 is formed as a groove for ensuring that the holder 40 follows up-down movement of the driving projection part 14 but does not follow movement in a direction intersecting with the second rotational axis L2 in the case where the operation lever 10 has been subjected to the second rotation operation around the second rotational axis L2 (the dimmer operation).

Additionally, as illustrated in FIG. 3, a holding groove 42 for holding and allowing the magnet 50 to move up and down in the case where the operation lever 10 has been subjected to the second rotation operation around the second rotational axis L2 (the dimmer operation) is formed in a lower portion of the holder 40. The holding groove 42 is formed as a groove for ensuring that the holder 40 does not follow movement around the first rotational axis L1 in the case where the operation lever 10 has been subjected to the first rotation operation around the first rotational axis L1 (the turn operation).

Configuration of Magnet 50

Figure 5A:
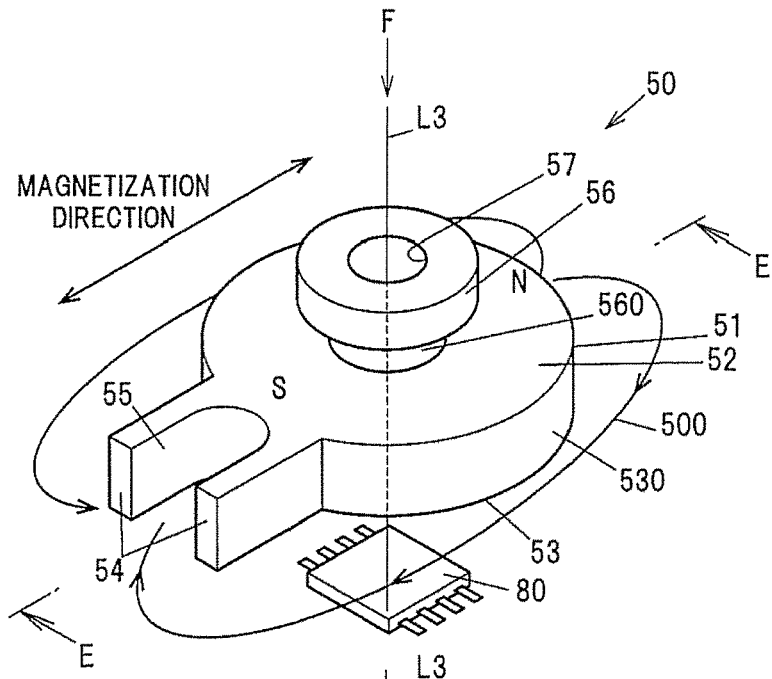
FIG. 5A is a perspective view illustrating the magnetization direction of a magnet, the state of a magnetic flux, and the positional relationship with a turn detection sensor.
Figure 5B:
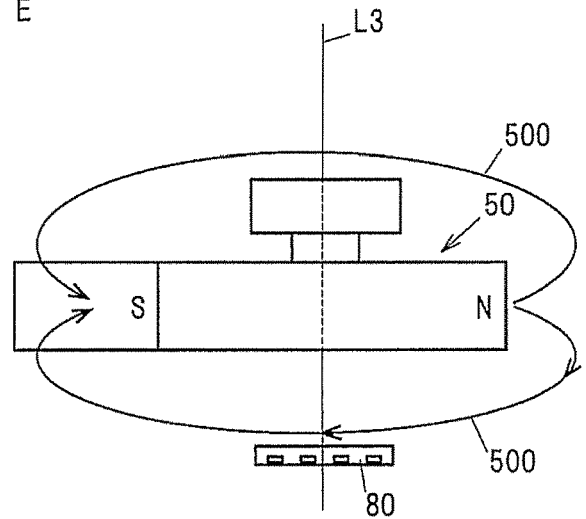
FIG. 5B is a cross-sectional view taken along E-E in FIG. 5A.
Figure 5C:
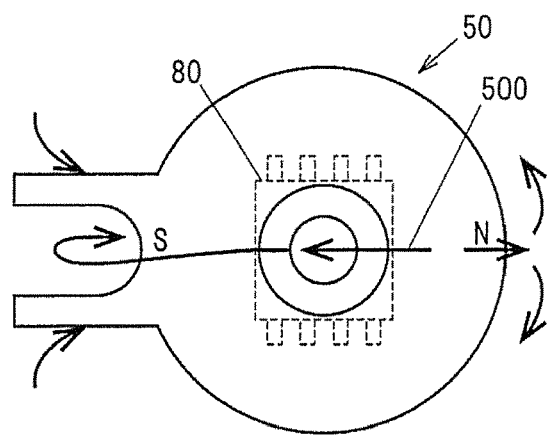
FIG. 5C is a plan view illustrating the state of the magnetic flux and the positional relationship with the turn detection sensor, viewed from a direction F in FIG. 5A.
Figure 6A:
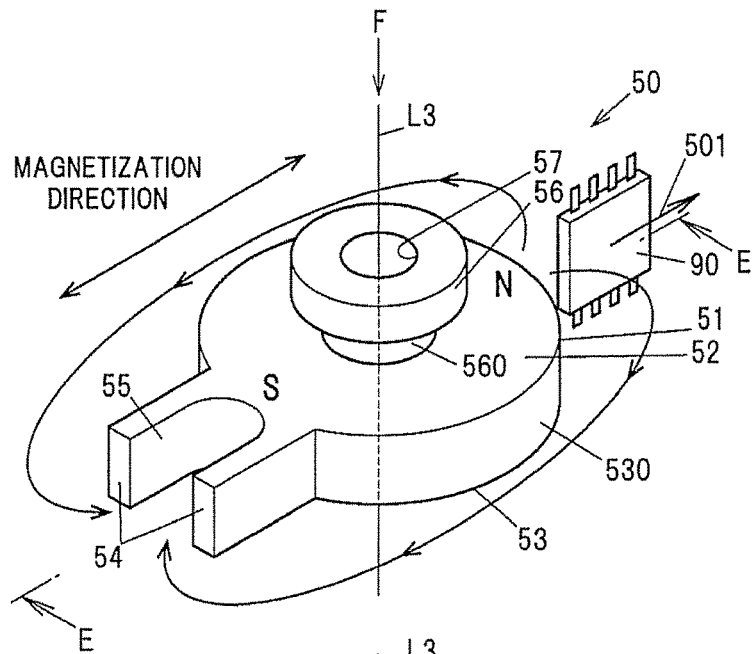
FIG. 6A is a perspective view illustrating the magnetization direction of a magnet, the state of a magnetic flux, and the positional relationship with a dimmer detection sensor.
Figure 6B:
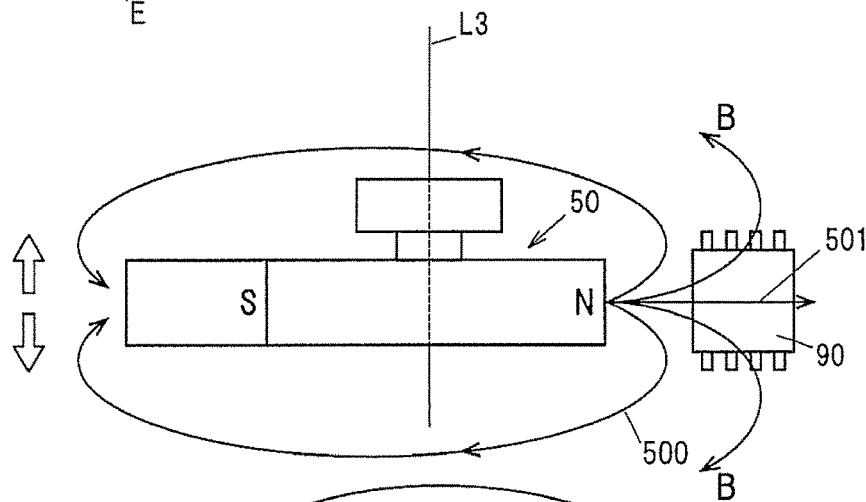
FIG. 6B is a cross-sectional view taken along E-E in FIG. 6A.
Figure 6C:
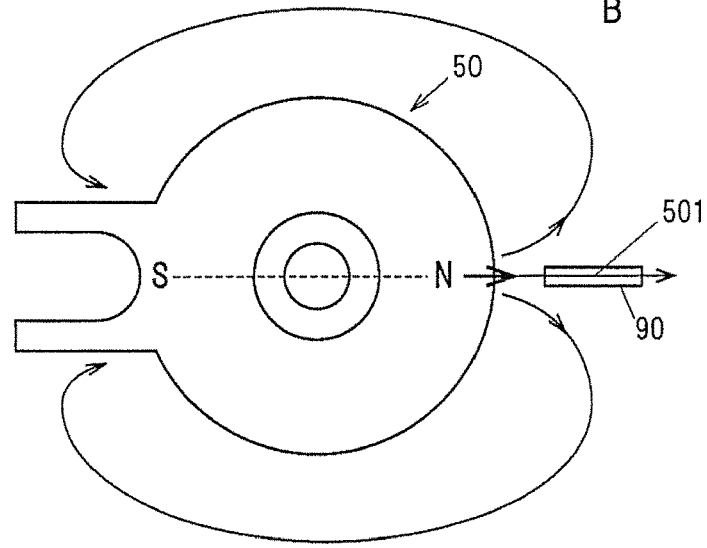
FIG. 6C is a plan view illustrating the state of the magnetic flux and the positional relationship with the dimmer detection sensor, viewed from a direction F in FIG. 6A.

FIG. 5A is a perspective view illustrating the magnetization direction of the magnet, the state of a magnetic flux, and the positional relationship with the turn detection sensor; FIG. 5B is a cross-sectional view taken along E-E in FIG. 5A; and FIG. 5C is a plan view illustrating the state of the magnetic flux and the positional relationship with the turn detection sensor 80 viewed from a direction F in FIG. 5A. FIG. 6A is a perspective view illustrating the magnetization direction of the magnet, the state of a magnetic flux, and the positional relationship with the turn detection sensor; FIG. 6B is a cross-sectional view taken along E-E in FIG. 6A; and FIG. 6C is a plan view illustrating the state of the magnetic flux and the positional relationship with the dimmer detection sensor 90 viewed from a direction F in FIG. 6A.

The magnet 50 is a plastic magnet formed into a desired shape by mixing, for example, a permanent magnet, such as an alnico magnet, a ferrite magnet, or a neodymium magnet, or a ferrite-based, neodymium-based, samarium-cobalt-based, or samarium-iron-nitrogen-based magnetic material, with a polystyrene-based, polyethylene-based, polyamide-based, or acrylonitrile/butadiene/styrene (ABS) synthetic resin material. In the present embodiment, a plastic magnet is used as the magnet 50.

The magnet 50 has a donut shape in which the through hole 57 is provided. Specifically, as illustrated in FIGS. 3 and 5A, the magnet 50 has a shape in which a disk part 51 and a cylindrical part 56 are stacked coaxially on the upper surface 52 with a circumferential groove part 560 located therebetween, and the through hole 57 is formed passing through the magnet 50 along the third rotational axis L3. Additionally, two projecting parts 54 are formed projecting radially from one side of the disk part 51, and a recess part 55 with which the driving projection part 34 of the bracket 30 fits is formed in a region between the two projecting parts 54.

The magnetization direction of the magnet 50 is orthogonal to the third rotational axis L3 and corresponds to the direction in which the projecting parts 54 extends, as illustrated in FIG. 5A and the like. This magnetization results in an S pole on the side of the magnet 50 where the projecting parts 54 are located and an N pole on the side opposite the projecting parts 54. Note that magnetization with reversed polarity is also possible. As illustrated in FIGS. 5A and 5C, this magnetization forms a magnetic flux 500 in which a representative magnetic flux radiates from the N pole toward the S pole of the magnet 50, and magnetic fluxes radiating from the N pole in a radial direction pass below the disk part 51 of the magnet 50 and converge on the S pole.

Configuration of Magnet Holder 70

Figure 7:
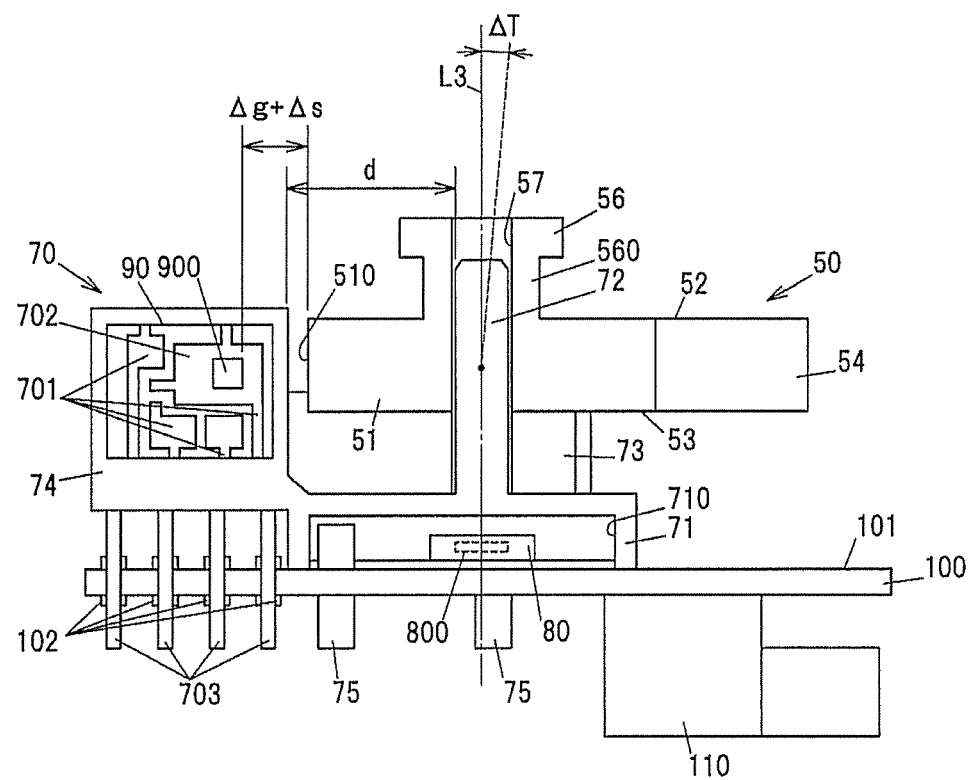
FIG. 7 is a cross-sectional view, corresponding to a G-G cross-section in FIG. 3 and the E-E cross-section in FIG. 5A, illustrating a magnet holder and a magnet according to the embodiment of the present invention.

FIG. 7 is a cross-sectional view illustrating the magnet holder and the magnet according to the embodiment of the present invention, corresponding to a G-G cross-section in FIG. 3 and the E-E cross-section in FIG. 5A. FIG. 7 illustrates a state in which the magnet 50 is attached to the magnet holder 70.

The magnet holder 70 is fixed to the board 100 by a plurality of leg parts 75, and is positioned relative to and fixed to the lower housing 22. The magnet holder 70 includes: a bottom part 71; the magnet support shaft 72 formed protruding from the bottom part 71 toward the magnet 50; a wall part 73 formed concentric with the magnet support shaft 72, protruding from the bottom part 71 toward the magnet 50; the attachment part 74 for attaching the dimmer detection sensor 90; and the like. This magnet holder 70 is formed as a single entity from a resin (a non-magnetic material).

The magnet support shaft 72 is formed so as to fit into the through hole 57 of the magnet 50 so that the magnet 50 can rotate and slide. In the case where the operation lever 10 has been subjected to the second rotation operation around the second rotational axis L2 (the dimmer operation), the magnet support shaft 72 supports the up and down movement of the magnet 50 along the third rotational axis L3. Although the wall part 73 is provided along an outer periphery of the magnet 50, it should be noted that the magnet 50 is mainly supported by the magnet support shaft 72.

A storage space 710 is provided below the bottom part 71 as illustrated in FIG. 7. The turn detection sensor 80, which is arranged on the arrangement surface 101 of the board 100, is located in the storage space 710.

The magnet support shaft 72 is inserted into the through hole 57 of the magnet 50, and rotatably supports the magnet 50. To increase the accuracy of the detection of movement of the magnet 50 along the third rotational axis L3, it is preferable that a gap $\Delta g$ between a side surface 510 of the magnet 50 into which the magnet support shaft 72 has been inserted and an MR sensor unit 900, which will be described later, that is arranged in the attachment part 74, be an assumed design value. This design value is, for example, 2.0 mm±0.5 mm ($\Delta g \pm \Delta s$).

As illustrated in FIG. 7, $\Delta s$ depends at least on a distance d between the magnet support shaft 72 and the attachment part 74, and a tilt $\Delta T$ produced by a difference between the diameter of the magnet support shaft 72 and the diameter of the through hole 57 of the magnet 50. For example, in consideration of a distance L and the tilt $\Delta T$, it is preferable that $\Delta s$ be from 0.4 to 1.0 mm, and more preferably from 0.5 to 0.7 mm In the present embodiment, the magnet 50 has a donut shape, or in other words, the magnet support shaft 72 inserted into the through hole 57 that follows the third rotational axis L3 rotatably supports the magnet 50, rather than the magnet 50 being supported by the wall part 73 of the magnet holder 70. This makes it possible to increase the accuracy of the gap $\Delta g$.

As illustrated in FIG. 7, a plurality of lead frames 701 are formed integrally with the attachment part 74 through insert molding. Terminals 703 of the lead frames 701 are exposed on the outside of the attachment part 74, and are inserted into via holes formed in the board 100 and electrically connected to wires 102 of the board 100 using solder or the like. The MR sensor unit 900 of the dimmer detection sensor 90, which will be described later, is, for example, attached to an installation part 702 of a lead frame 701 using a conductive adhesive or the like, and is electrically connected to the other lead frames 701 through wire bonding.

The operation lever 10, housing 20, bracket 30, and holder 40 described above are disposed near the magnet 50, and thus it is preferable that, like the magnet holder 70, these elements be formed from a non-magnetic material such as a resin.

Configuration of Magnetometric Sensor

A magnetometric sensor serving as a detection part includes the turn detection sensor 80 and the dimmer detection sensor 90. Magneto resistive (MR) sensors with magneto resistive elements are employed for both the turn detection sensor 80 and the dimmer detection sensor 90. A sensor such as a hall sensor using a hall element can be given as another example of a magnetometric sensor.

In the case where the turn detection sensor 80 and the dimmer detection sensor 90 are packaged in a single chip including, for example, an amplifier that amplifies a signal, a processor that processes the signal, and the like, an MR sensor constituted of a plurality of MR elements may be disposed in a location outside the center of the chip. In the present embodiment, the turn detection sensor 80 includes an MR sensor unit 800, whereas the dimmer detection sensor 90 includes the MR sensor unit 900. As illustrated in FIG. 7, the turn detection sensor 80 is disposed so that a sensor center of the MR sensor unit 800 is aligned with the third rotational axis L3. The dimmer detection sensor 90 is disposed so that a sensor center of the MR sensor unit 900 is aligned with the center of the side surface 510 of the magnet 50 when in the neutral position. Note that, in the case where a bridge circuit is formed from four MR elements, for example, the sensor center refers to the center of the bridge circuit; and in the case of a hall element, refers to the center of a detection surface.

As illustrated in FIGS. 3 and 4, the turn detection sensor 80 is disposed upon the third rotational axis L3, within the storage space 710 below the magnet 50. As illustrated in FIGS. 4 and 5A, the turn detection sensor 80 is mounted on the board 100 at a predetermined distance from the lower surface 53 of the magnet 50, and is positioned relative to and fixed to the lower housing 22.

As illustrated in FIGS. 5A to 5C, the magnetic flux 500 is formed, in which a representative magnetic flux of the magnet 50 radiates from the N pole toward the S pole of the magnet 50, and magnetic fluxes radiating from the N pole in the radial direction pass below the disk part 51 of the magnet 50 and converge on the S pole. The turn detection sensor 80 is disposed so as to be capable of detecting only a change in the direction of the magnetic field of the magnetic flux 500. In other words, the turn detection sensor 80 is disposed in a position where a change in the direction of the magnetic field in response to rotation of the magnet 50 can be detected, but where the direction of the magnetic field does not change in response to up and down sliding of the magnet 50. The turn detection sensor 80 is constituted of a bridge of MR elements, which will be described later, and is disposed so that a plane made by the MR sensor unit 800 including the bridge serves as a plane where the direction of the magnetic field changes.

As illustrated in FIGS. 3 and 4, the dimmer detection sensor 90 is disposed so that the sensor center of the MR sensor unit 900 is positioned near the outer periphery of the magnet 50 and in the center in the thickness direction of the disk part 51 when the magnet 50 is in the neutral position (a position where the magnet 50 has not slid up or down). As illustrated in FIG. 4, the dimmer detection sensor 90 is mounted using the attachment part 74 of the magnet holder 70.

As illustrated in FIGS. 6A to 6C, a magnetic flux 501 is formed, in which a representative magnetic flux of the magnet 50 radiates from the N pole toward the S pole of the magnet 50, and magnetic fluxes radiating from the N pole in the radial direction pass below the disk part 51 of the magnet 50 and converge on the S pole. The dimmer detection sensor 90 is disposed so as to be capable of detecting only a change in the direction of the magnetic field produced by the magnetic flux 501 on the N pole side. In other words, the dimmer detection sensor 90 is disposed in a position where a change in the direction of the magnetic field in response to up and down sliding of the magnet 50 can be detected, but where the direction of the magnetic field does not change in response to rotation of the magnet 50. The dimmer detection sensor 90 is constituted of a bridge of MR elements, which will be described later, and is disposed so that a plane made by the MR sensor unit 900 including the bridge serves as a plane where the direction of the magnetic field changes.

Operations of Lever Switch Device 1 and Detection Operation

Operations of the lever switch device 1 and rotation detection operations performed in the first rotation operation (the turn operation) and the second rotation operation (the dimmer operation) according to the present embodiment will be described hereinafter.

Turn Operation and Detection Operation

Figure 8A:
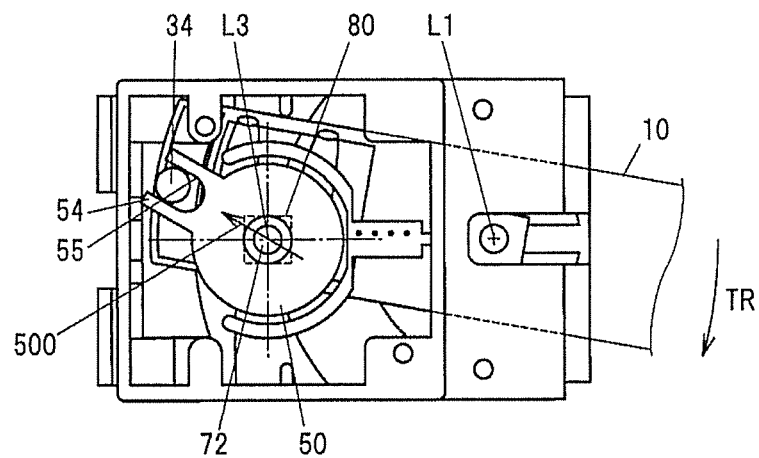
FIG. 8A is a plan view illustrating a state of movement of the lever and the magnet during a right turn operation (an operation in the direction of an arrow TR) as viewed from a B direction in FIG. 2.
Figure 8B:
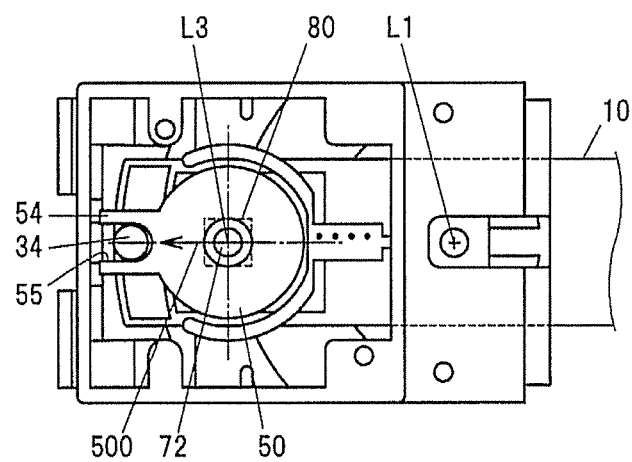
FIG. 8B is a plan view illustrating a state of movement of the lever and the magnet when in the neutral positon as viewed from the B direction in FIG. 2.
Figure 8C:
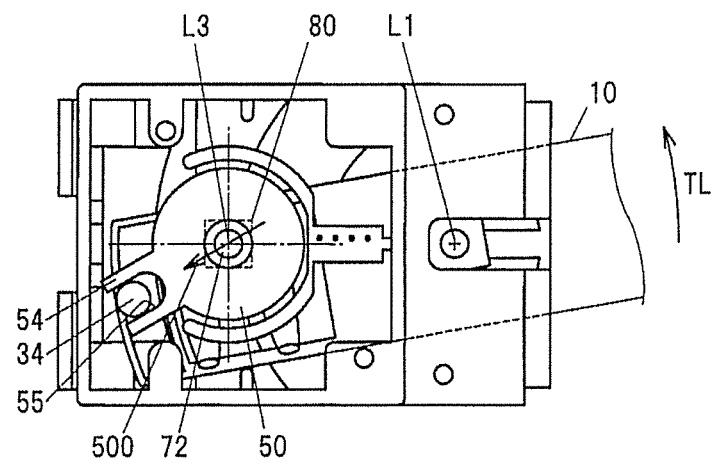
FIG. 8C is a plan view illustrating a state of movement of the lever and the magnet during a left turn operation (an operation in the direction of an arrow TL) as viewed from the B direction in FIG. 2. Note that FIGS. 8A to 8C are plan views taken from the B direction with an upper housing removed.

FIG. 8A is a plan view illustrating a state of movement of the lever and the magnet during the right turn operation (an operation in the direction of the arrow TR) as viewed from a B direction in FIG. 2, FIG. 8B is a plan view illustrating a state of movement of the lever and the magnet when in the neutral position, as viewed from the B direction in FIG. 2, and FIG. 8C is a plan view illustrating a state of movement of the lever and the magnet during the left turn operation (an operation in the direction of the arrow TL) as viewed from the B direction in FIG. 2. Note that FIGS. 8A to 8C are plan views taken from the B direction with the upper housing 21 removed.

As illustrated in FIG. 8A, when the operation lever 10 is operated in the direction of the arrow TR by the first rotation operation (the turn operation), the operation lever 10 rotates around the first rotational axis L1. The bracket 30 illustrated in FIG. 3 moves integrally with the operation lever 10, and the driving projection part 34 also rotates around the first rotational axis L1. Because the recess part 55 is fitted with the driving projection part 34, the magnet 50 rotates around the magnet support shaft 72 (the third rotational axis L3) in response to the rotation operation on the operation lever 10. This changes the direction of the magnetic field of the magnetic flux 500 traversing the turn detection sensor 80, illustrated in FIGS. 5A, 5C, and 8A.

FIG. 8B illustrates a neutral position state, where the operation lever 10 is not being rotationally operated. In this state, the operation lever 10 and the bracket 30 do not rotate, and thus the magnet 50 does not rotate. Therefore, the direction of the magnetic field of the magnetic flux 500 traversing the turn detection sensor 80, illustrated in FIGS. 5A, 5C, and 8B, does not change.

As illustrated in FIG. 8C, when the first rotation operation (the turn operation) is performed on the operation lever 10 in the direction of the arrow TL, the operation lever 10 rotates around the first rotational axis L1. The bracket 30 illustrated in FIG. 3 moves integrally with the operation lever 10, and the driving projection part 34 also rotates around the first rotational axis L1. Because the recess part 55 is fitted with the driving projection part 34, the magnet 50 rotates around the magnet support shaft 72 (the third rotational axis L3) in response to the rotation operation on the operation lever 10. This changes the direction of the magnetic flux 500 traversing the turn detection sensor 80, illustrated in FIGS. 5A, 5C, and 8C. Note that the change in the direction of the magnetic field of the magnetic flux 500 is in the opposite direction from when the operation lever 10 is operated in the direction of the arrow TR.

Rotation Detection Operation

Figure 9A:
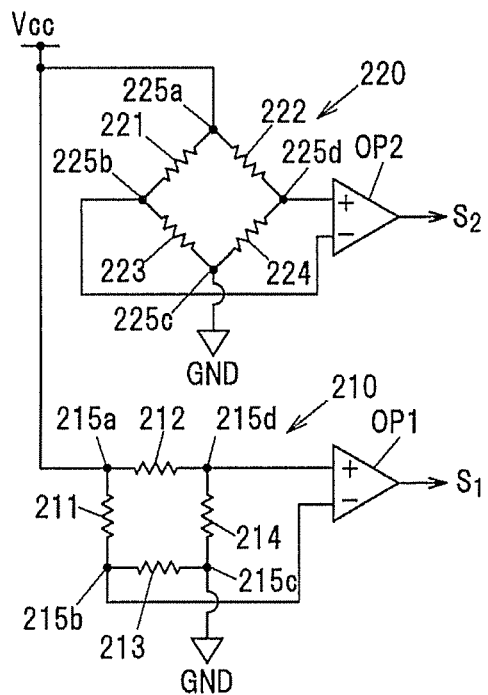
FIG. 9A is a circuit diagram illustrating an example of a magnetometric sensor.
Figure 9B:
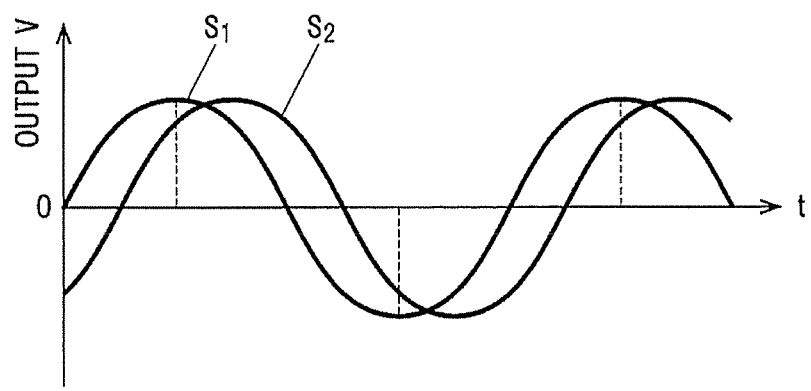
FIG. 9B shows signal waveforms of detection signals S1 and S2 detected by a first MR bridge and a second MR bridge.

FIG. 9A is a circuit diagram illustrating an example of the magnetometric sensor, and FIG. 9B shows signal waveforms of detection signals S1 and S2 detected by a first MR bridge and a second MR bridge.

FIG. 9A illustrates a configuration in which two full bridges are disposed at a 45° angle of rotation. The configuration is such that an intermediate voltage is inputted into an op-amp (differential amplifier) OP1 from nodes 215b and 215d of a first MR bridge 210 (MR elements 211, 212, 213, and 214), and the detection signal S1 can be detected as a differential signal. Likewise, the configuration is such that an intermediate voltage is inputted into an op-amp (differential amplifier) OP2 from nodes 225b and 225d of a second MR bridge 220 (MR elements 221, 222, 223, and 224), and the detection signal S2 can be detected as a differential signal. The MR sensor unit 800 is constituted of the first MR bridge 210 and the second MR bridge 220. Note that a reference voltage Vcc is applied to nodes 215a and 225a, and nodes 215c and 225c are grounded (GND). The detection signal S1 and the detection signal S2 are outputted to, for example, a vehicle controller of the vehicle 5 via a connector 110 provided on the board 100.

The turn detection sensor 80 including the MR sensor unit 800 configured as described above outputs the detection signals S1 and S2 corresponding to changes in the direction of the magnetic field of the magnet 50 disposed facing the turn detection sensor 80, the detection signals S1 and S2 being able to be detected as having a phase difference of 45°, as illustrated in FIG. 9B. For example, the directional position of the magnetic field can be calculated by performing an Arctan process that finds an arc tangent by dividing the two detection signals S1 and S2, and referring to an Arctan table stored in a storage part as a table, for example. The calculated directional position of the magnetic field corresponds to the position of the rotation operation of the operation lever 10. It is therefore possible to detect how the operation lever 10 has been operated around the first rotational axis L1 (that is, a left turn operation, namely an operation in the direction of the arrow TL, or a right turn operation, namely an operation in the direction of the arrow TR).

Dimmer Operation and Detection Operation

Figure 10A:
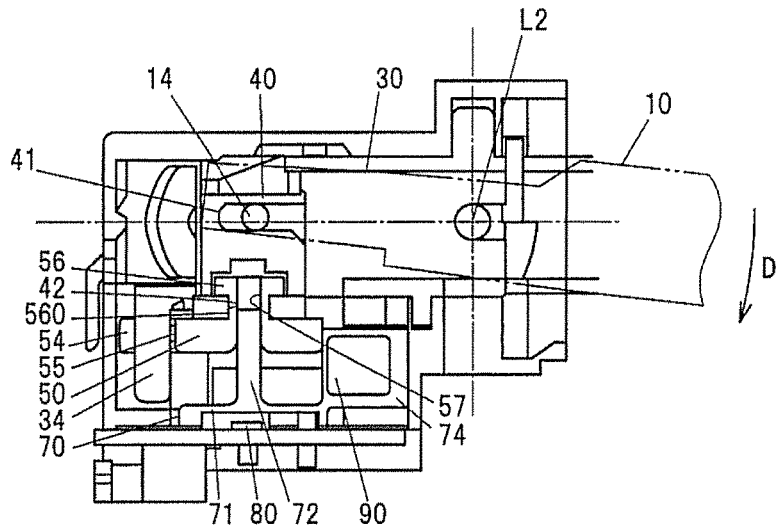
FIG. 10A is a partial cross-sectional view illustrating a state of movement of the lever and the magnet during a dimming operation, in the A-A cross-section indicated in FIG. 2.
Figure 10B:
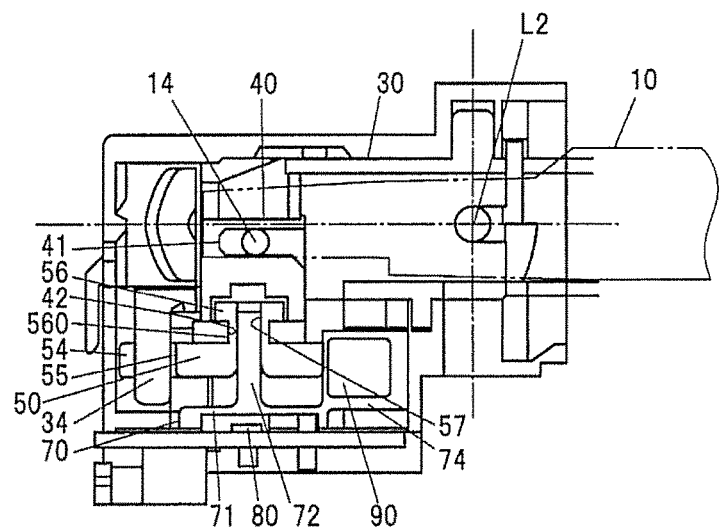
FIG. 10B is a partial cross-sectional view illustrating a state of movement of the lever and the magnet when in the neutral position, in the A-A cross-section indicated in FIG. 2.
Figure 10C:
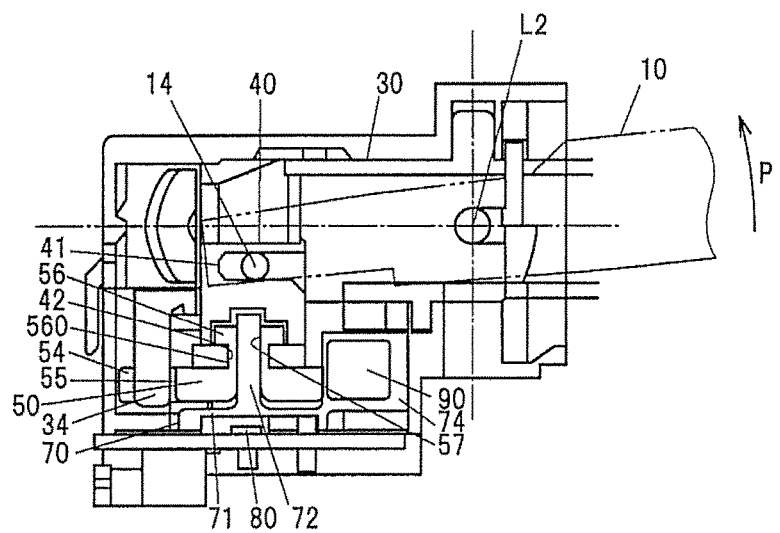
FIG. 10C is a partial cross-sectional view illustrating a state of movement of the lever and the magnet during a high beam flashing operation, in the A-A cross-section indicated in FIG. 2.

FIG. 10A is a partial cross-sectional view illustrating a state of movement of the lever and the magnet during the dimmer operation, in the A-A cross-section indicated in FIG. 2, FIG. 10B is a partial cross-sectional view illustrating a state of movement of the lever and the magnet when in the neutral position, in the A-A cross-section indicated in FIG. 2, and FIG. 10C is a partial cross-sectional view illustrating a state of movement of the lever and the magnet during the high beam flashing operation, in the A-A cross-section indicated in FIG. 2.

As illustrated in FIG. 10A, when the second rotation operation (the dimmer operation) is performed on the operation lever 10 in the direction of the arrow D, the operation lever 10 rotates around the second rotational axis L2. Because the driving projection part 14 of the operation lever 10 moves upward, the holder 40 illustrated in FIG. 3 slides upward via the fitting groove 41 fitted with the driving projection part 14. The magnet 50 held by the holding groove 42 of the holder 40 slides upward while being supported by the magnet support shaft 72. This changes the direction of the magnetic field of the magnetic flux 501 traversing the dimmer detection sensor 90, illustrated in FIGS. 6A, 6C, and 10A.

FIG. 10B illustrates a neutral position state, where the operation lever 10 is not being rotationally operated. In this state, the operation lever 10 does not rotate and the holder 40 does not slide, and thus the magnet 50 does not slide. Therefore, the direction of the magnetic field of the magnetic flux 501 traversing the dimmer detection sensor 90, illustrated in FIGS. 6A, 6C, and 10B, does not change.

As illustrated in FIG. 10C, when the second rotation operation (the high beam flashing operation) is performed on the operation lever 10 in the direction of the arrow P, the operation lever 10 rotates around the second rotational axis L2. Because the driving projection part 14 of the operation lever 10 moves downward, the holder 40 illustrated in FIG. 3 slides downward via the fitting groove 41 fitted with the driving projection part 14. The magnet 50 held by the holding groove 42 of the holder 40 slides downward while being supported by the magnet support shaft 72. This changes the direction of the magnetic flux 501 traversing the dimmer detection sensor 90, illustrated in FIGS. 6A, 6C, and 10C. Note that the change in the direction of the magnetic field of the magnetic flux 501 is in the opposite direction from when the operation lever 10 is operated in the direction of the arrow D.

Rotation Detection Operation

Like the turn detection sensor 80, the dimmer detection sensor 90 includes the MR sensor unit 900, which is constituted of two full bridges disposed at a 45° angle of rotation, as illustrated in FIG. 9A. Accordingly, like the turn detection sensor 80, a calculated directional position of the magnetic field corresponds to the position of the rotation operation of the operation lever 10. It is therefore possible to detect how the operation lever 10 has been operated around the second rotational axis L2 (that is, the dimmer operation, namely the operation in the direction of the arrow D, or the high beam flashing operation, namely the operation in the direction of the arrow P).

Effects of Embodiment

According to the lever switch device 1 of the present embodiment, the following effects are achieved.

(1) In the present embodiment, the magnet 50 is formed in a donut shape, with the through hole 57 formed therein, and by inserting the magnet support shaft 72 of the magnet holder 70 into the through hole 57, the magnet 50 is supported so as to be capable of rotating and of sliding along the third rotational axis L3. As such, according to the lever switch device 1, looseness in the rotation of the magnet 50 is suppressed as compared to a case where the magnet 50 does not have a donut shape, which makes it possible to increase the accuracy with which rotation and movement of the magnet 50 is detected.

(2) In the present embodiment, the attachment part 74 in which the dimmer detection sensor 90 is disposed and the magnet support shaft 72 to which the magnet 50 is attached are formed integrally. This makes it easy to position the magnet 50 and the dimmer detection sensor 90 relative to each other, suppresses manufacturing costs, and improves the detection accuracy.

(3) In the present embodiment, the magnet 50 moves in two directions, by rotating and sliding, in response to operations in two intersecting directions, namely the turn operations and the dimmer operations on the operation lever 10. The present embodiment is configured so that the magnet 50 can move in different directions, and thus two directions can be detected using a single magnet.

(4) In the present embodiment, movement of the magnet 50 in different directions is detected by two magnetometric sensors, namely the turn detection sensor 80 and the dimmer detection sensor 90. The turn detection sensor 80 is disposed in a position where a change in the direction of the magnetic field in response to rotation of the magnet 50 can be detected, but where the direction of the magnetic field does not change in response to sliding of the magnet 50. On the other hand, the dimmer detection sensor 90 is disposed in a position where a change in the direction of the magnetic field in response to sliding of the magnet 50 can be detected, but where the direction of the magnetic field does not change in response to rotation of the magnet 50. Accordingly, two-directional detection that eliminates or greatly reduces crosstalk is possible for movement of a single magnet.

(5) The configuration in which two magnetometric sensors are used for detection with respect to a single magnet makes it possible to reduce costs as compared to a conventional configuration in which two magnets are used. Additionally, reducing the number of magnets reduces a range required for turn detection and dimmer detection, which makes it possible to reduce the size of the lever switch device.

Although embodiments of the present invention have been described above, these embodiments are merely examples and the invention according to claims is not to be limited thereto. Such novel embodiments may be implemented in various other forms, and various omissions, substitutions, changes, and the like can be made without departing from the spirit and scope of the present invention. In addition, all combinations of the features described in these embodiments are not necessary to solve the problem. Further, these embodiments are included within the spirit and scope of the invention and also within the invention described in the claims and the scope of equivalents thereof.

INDUSTRIAL APPLICABILITY

The present invention can be applied to a lever switch device used to operate turn signals (directional indicator) and headlamps of a vehicle.

What is claimed is:

1. A rotational movement detection device, comprising:
a housing;
a rotating member rotatably mounted within the housing comprising a through hole passing therethrough from a first surface to a second surface opposite the first surface, the rotating member rotating around a rotational axis extending through the through hole to generate a magnetic field around the rotating member;
a rotation angle detection part that detects a rotation angle of the rotating member;
a movement detection part that detects a movement along a rotational axis of the rotating member;
a holding part disposed within the housing comprising a guide part and an arrangement part formed integrally therein, the guide part being inserted into the through hole to guide the rotation of the rotating member and to hold the rotating member, the arrangement part having thereon the movement detection part arranged facing a side surface of the rotating member, the holding part being arranged on an arrangement surface of a base member, the arrangement surface intersecting the rotational axis of the rotating member,
an operation part capable of being rotated about a first rotational axis, and a second rotational axis, wherein the first and second rotational axes intersect one another;
a first conversion part pivotally mounted within the housing and coupled to the operation part at one portion and to the rotating member at another portion that converts rotation of the operation part around the first rotational axis into rotation of the rotating member around its rotational axis; and
a second conversion part moveably mounted within the housing and coupled linked to the operation part at one portion and to the rotating member at another portion that converts rotation of the operation part around the second rotational axis into a relative movement of the rotating member toward and away from the arrangement surface,
wherein the rotational axis of the rotating member is different from either the first or the second rotational axes.

2. The device according to claim 1, wherein a terminal of the movement detection part is electrically connected to a wire provided on the arrangement surface of the base member.

3. The device according to claim 2, wherein the rotating member comprises a magnet having a disk part in a center of which the through hole is formed so as to allow the guide part to be inserted thereinto.

4. The device according to claim 1, wherein the rotating member comprises a magnet having a disk part in a center of which the through hole is formed so as to allow the guide part to be inserted thereinto.

5. The device according to claim 1,
wherein the rotating member comprises a magnet having a disk part in a center of which the through hole is formed so as to allow the guide part to be inserted thereinto, and
wherein the disk part of the magnet rotates around the guide part while allowing the guide part to be inserted into the through hole according to the first rotation operation of the operating part.

6. The device according to claim 1,
wherein the rotating member comprises a magnet having a disk part in a center of which the through hole is formed so as to allow the guide part to be inserted thereinto, and
wherein the disk part of the magnet slides along the guide part while allowing the guide part to be inserted into the through hole according to the second rotation operation of the operating part.

* * * * *

UNITED STATES PATENT AND TRADEMARK OFFICE
CERTIFICATE OF CORRECTION

PATENT NO. : 10,176,944 B2
APPLICATION NO. : 15/319957
DATED : January 8, 2019
INVENTOR(S) : Koji Saito, Yoshikazu Kataoka and Tadashi Usuya Page 1 of 1

It is certified that error appears in the above-identified patent and that said Letters Patent is hereby corrected as shown below:

In the Claims

In Column 14, Line 23 Claim 1 the word "linked" should be deleted

Signed and Sealed this
Fifth Day of March, 2019

Andrei Iancu
*Director of the United States Patent and Trademark Office*